Aug. 31, 1937.   G. J. H. JACQUES ET AL   2,091,638
CIRCULAR KNITTING MACHINE
Filed Jan. 24, 1923    7 Sheets-Sheet 2

INVENTORS:
George J. H. Jacques
BY  James H. Jacques
Pennington and White
ATTORNEYS.

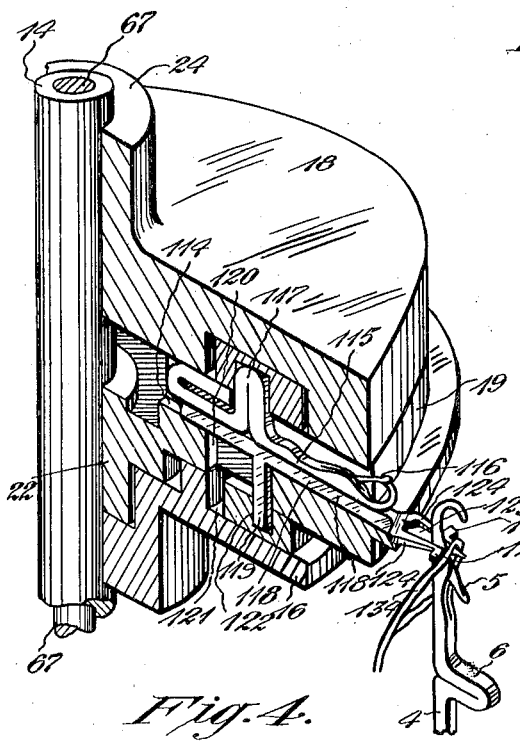

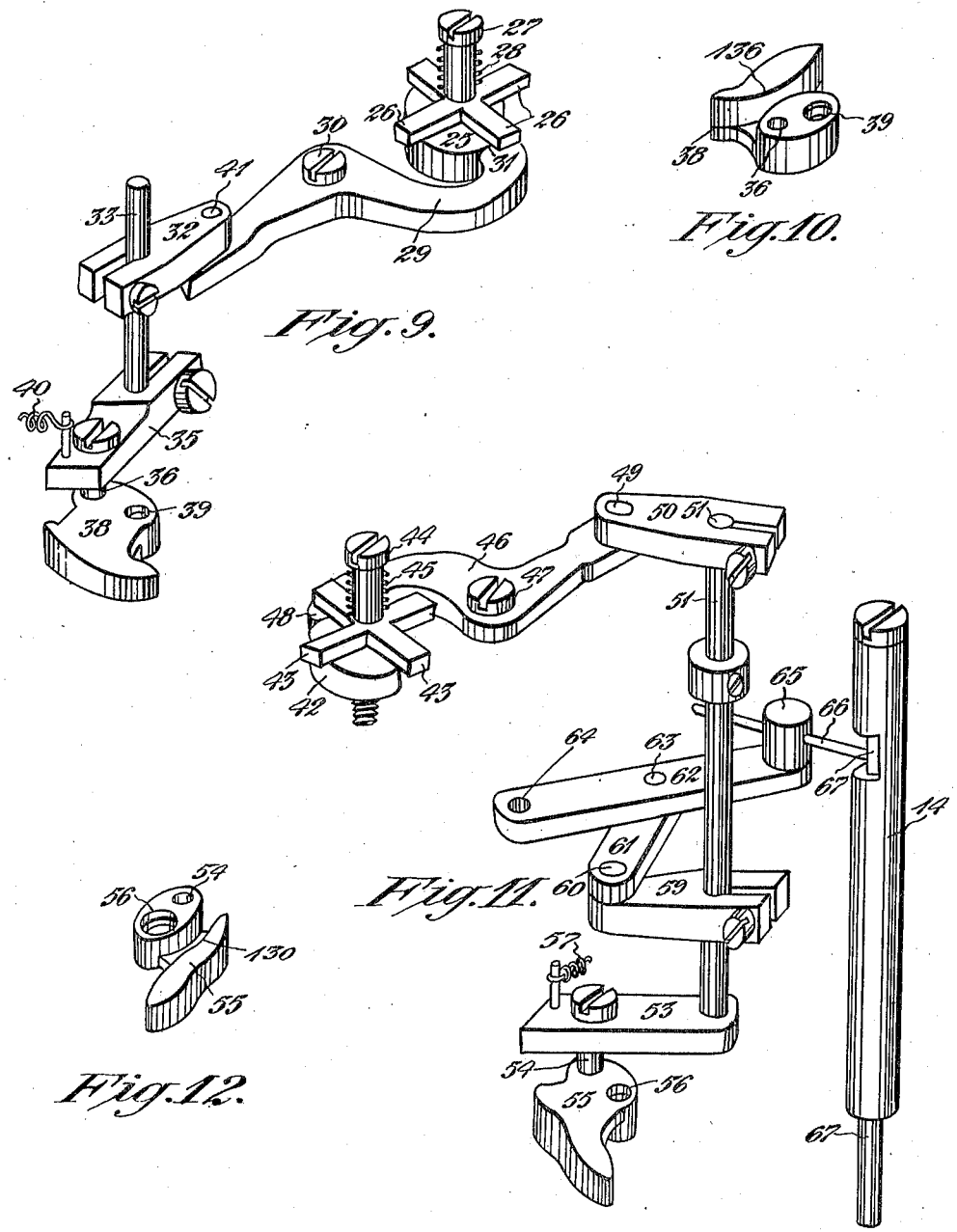

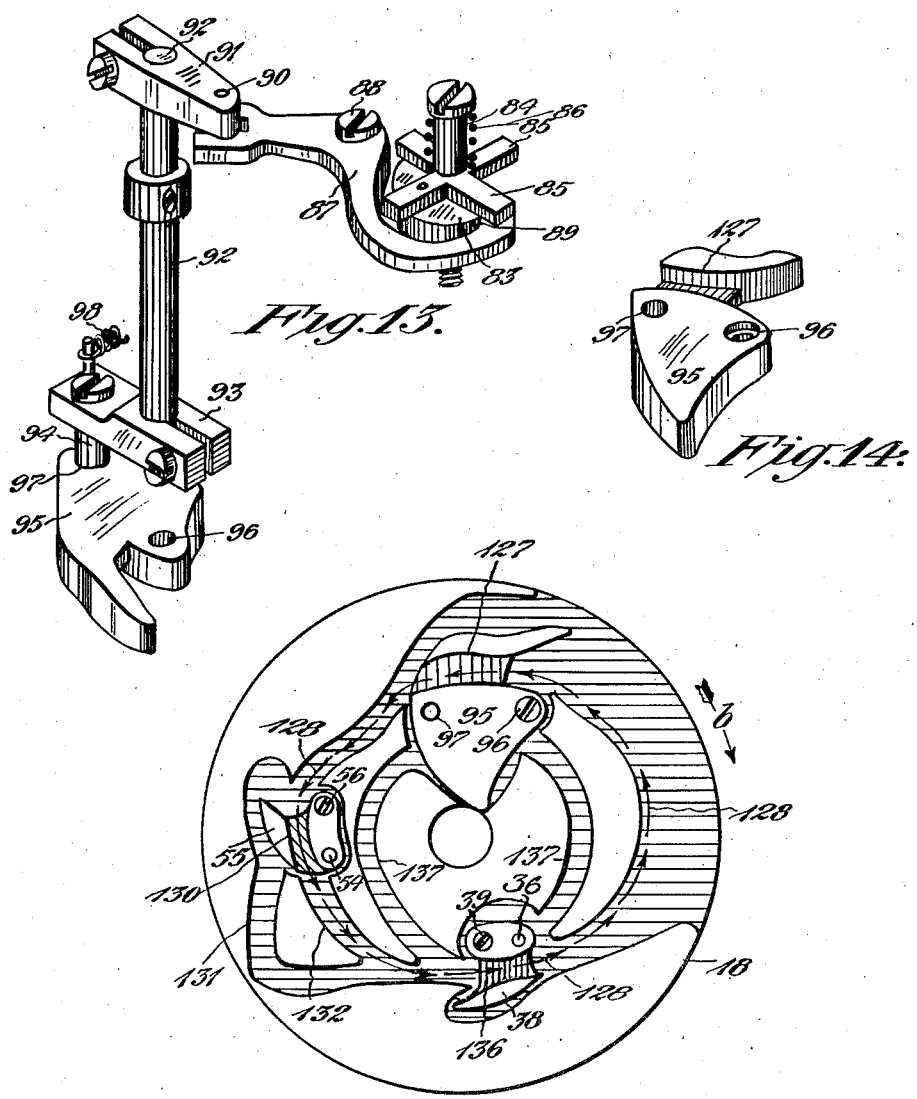

Aug. 31, 1937.  G. J. H. JACQUES ET AL  2,091,638
CIRCULAR KNITTING MACHINE
Filed Jan. 24, 1923    7 Sheets-Sheet 6

INVENTORS:
George J. H. Jacques
BY and Pierre H. Jacques
Pennington and White
ATTORNEYS.

Aug. 31, 1937.   G. J. H. JACQUES ET AL   2,091,638
CIRCULAR KNITTING MACHINE
Filed Jan. 24, 1928   7 Sheets-Sheet 7

INVENTORS:
George J. H. Jacques
BY Aime H. Jacques
ATTORNEYS.

Patented Aug. 31, 1937

2,091,638

UNITED STATES PATENT OFFICE 2,091,638

CIRCULAR KNITTING MACHINE

George J. H. Jacques and Aime H. Jacques, Pawtucket, R. I., assignors to Hemphill Company, Central Falls, R. I., a corporation of Massachusetts Application January 24, 1928, Serial No. 249,114

18 Claims. (Cl. 66—24)

This invention relates to an improved circular knitting machine for knitting tubular fabric, and more particularly to a machine of that character adapted for knitting stockings and the like. In the knitting of stockings of a conventional type it is customary to first knit a welt section to be followed by a ribbed section, which is in turn followed by a plain knit section forming the major portion of the stocking. The manner of forming the loops in knitting the welt, ribbed and plain portions is different in each instance and requires different cooperative relationship between the vertical and horizontal needles of the machine. Heretofore, these different cooperative relationships of the vertical and horizontal needles have only been obtainable by transferring the material in process from one type of machine to another or by manually controlling the operation of certain of the needles in effecting the change from one form of knitting to the other.

One object of the present invention is to provide means whereby a complete article comprising welt, ribbed and plain portions may be formed without removal of the fabric from the machine, the transition from one form of knitting to the other being effected automatically and, if desired, in accordance with a prearranged order or pattern which may be varied under the control of a pattern-chain or other suitable instrumentalities.

A further object of the invention is to provide improved automatic means for modifying the operation of the needles to change from welt knitting to ribbed knitting, or vice versa, and from either to plain knitting without stopping the machine; and to effect such change at any desired point in the formation of the article.

A further object of the invention is to provide improved means for automatically controlling the needles to change from one form of knitting to another at any desired point in the formation of the fabric during a single revolution of the cam or needle cylinder as the case may be.

A further feature of the invention is the provision of a novel form and arrangement of transfer mechanism for effecting the transfer of the loops or stitches from one bank of needles to another, specifically disclosed herein by way of example as from the dial to the cylinder needles, whereby the character of stitch may be changed; the transfer from dial to cylinder needles disclosed resulting in a change from rib to plain knitting.

Another feature of the invention is the provision of a novel form of control-mechanism for controlling the operation of the needles and transfer mechanism in changing from one type of knitting to another, including variable cams and means for controlling the operation of the modifying parts of said cams automatically and in accordance with a predetermined order.

Other features of the invention relate to the novel construction and arrangement of the control-mechanism and the relation of these parts to the conventional knitting machine elements, as well as the improved method of operation thereof which will be more fully pointed out in the detailed description to follow.

The invention is herein described and illustrated as embodied in a certain form of construction by way of example only, and in the accompanying drawings:

Fig. 4 is a perspective view of the dial and the associated cams which control the movement of the horizontal dial-needles and transfer-members, showing the parts in section in the vertical plane of their axis of rotation and illustrating the position of a dial-needle and its transfer-member immediately after the transfer of a loop from the former to the latter;

Fig. 5 is a perspective view of the dial shown in section in the vertical plane of its axis;

Fig. 6 is a perspective view of a dial-needle and its transfer-member or pick immediately before the loop is to be cast off from the dial-needle;

Fig. 7 is a perspective view of a dial-needle and its transfer-member or pick showing the position of these parts while the loop is being transferred from the dial-needle by the transfer-member;

Fig. 8 is a detailed perspective view of the transfer-member or pick;

Fig. 9 is a detached perspective view illustrating the operating parts of one of the cam-control devices;

Fig. 10 is a perspective view of the cam-switch shown inverted from its normal position as illustrated in Fig. 9;

Fig. 11 is a detached perspective view illustrating the operating parts of another of the cam-control devices;

Fig. 12 is a perspective view of the cam-switch shown in Fig. 11, illustrating it in inverted position;

Fig. 13 is a detached perspective view illustrating the operative parts of another of the cam-control devices;

Fig. 14 is a perspective view of the cam-switch shown in Fig. 13, illustrating it in inverted position;

Fig. 15 is a bottom plan view of the cam for controlling the operation of the dial-needles, the parts being shown in position for knitting the welt portion of a tubular fabric;

Figure 20:
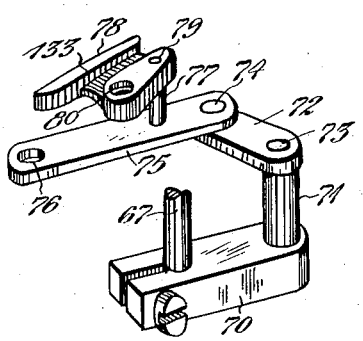
Figure 19:
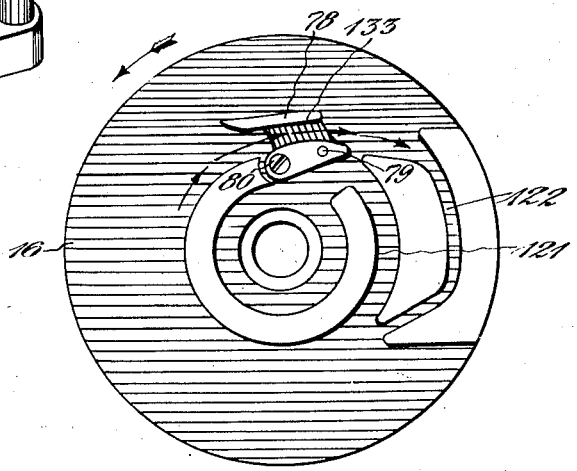

Fig. 19 is a top plan view of this cam for controlling the operation of the transfer-members or picks with the parts shown in the position they occupy when the transfer-members are being brought into operation to transfer the loops from the dial-needles to the vertical needles; and Fig. 20 is a detached perspective view of the operating parts for actuating the cam-switch for controlling the movement of the transfer-members.

Referring to the drawings, wherein like reference characters designate corresponding parts throughout the several views, 1 designates the table or bed-plate of a knitting machine on which is supported a stationary needle-cylinder 2 having slots 3 in its periphery for the reception of vertical needles 4, each of which is provided with a latch 5 and a butt 6 as is usual in machines of the present type. A cam-ring 7, having an undulating face 8 adapted to engage the butts 6 of the vertical needles 4, is rotatively mounted upon the table 1 surrounding the needle-cylinder 2, whereby upon rotation of the cam-ring the needles 4 are reciprocated to form circular courses of stitches in the tubular fabric in the manner as well known to those versed in the art. It is to be understood, however, that the present invention may be applied to use with a machine having a rotary needle-cylinder and a stationary cam-ring.

Bosses 9 carried by the cam-ring 7 are provided with vertical bores for the reception of the reduced ends 10 of posts 11 which support a frame 12 carrying the several cam-control mechanisms for the needles and the horizontal needle dial and parts associated therewith. Set-screws 13 in the bosses 9 engage the posts 11 to secure the frame 12 and its associated parts in proper adjustment relative to the needle-cylinder 2.

Figure 1:
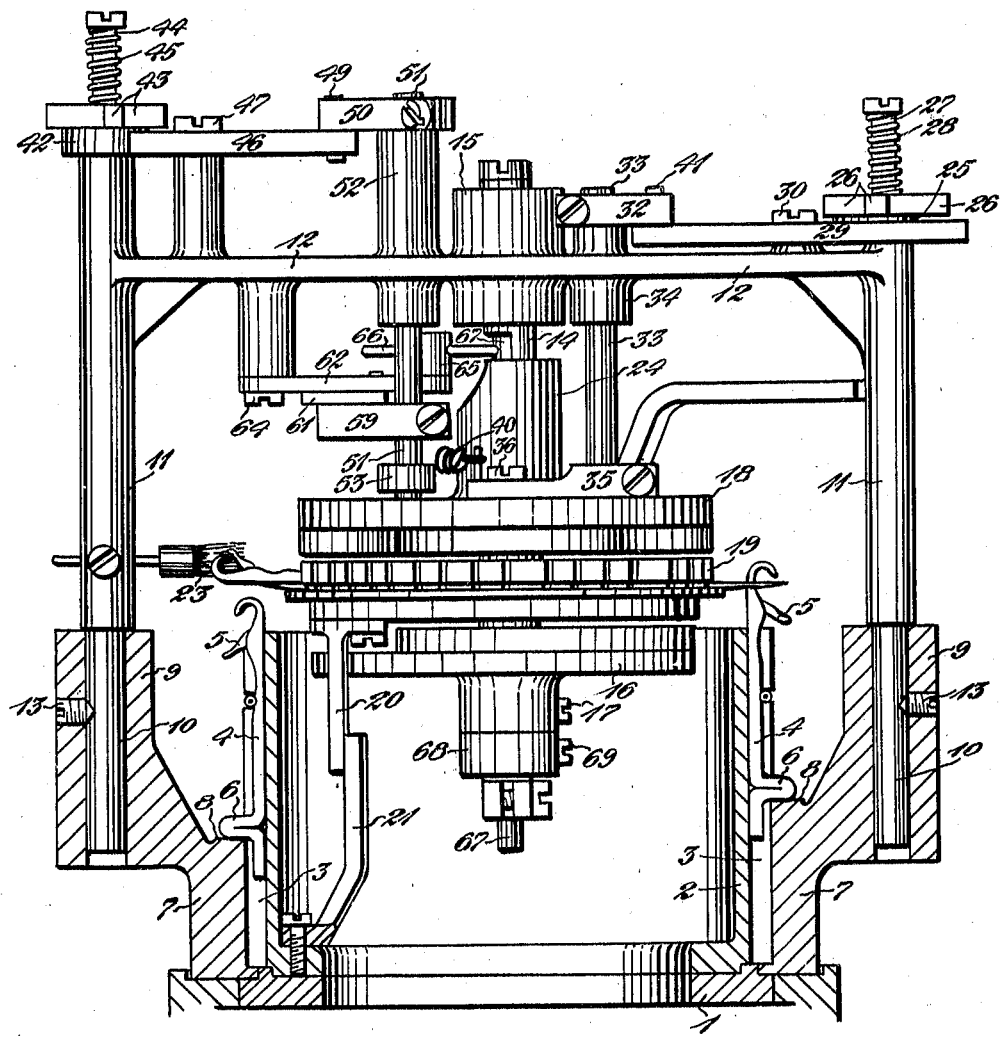
Fig. 1 is an elevational view, partly in section, of the needle cylinder of the knitting machine and its associated parts including the frame carrying the cam-control mechanism.

A central tubular bearing or sleeve 14 is fixed securely within a hub or boss 15 on the frame 12 by being driven into its bore. Secured to the lower end of the sleeve 14 by means of a set-screw 17 is a cam-plate 16 for controlling the transfer-members or picks, to be later described, and above this is the upper cam-plate 18 for the horizontal dial needles, also secured to the sleeve by similar means (not shown) passed through its hub 24. Referring to Fig. 4, the horizontal needle dial-plate 19 is positioned between the upper and lower cam-plates 18 and 16, being supported by its hub 22 which is free to turn on the sleeve 14. As shown in Fig. 1, a detent-arm 20 carried by the dial-plate 19 projects downwardly and engages a similar detent-arm 21 secured to the needle-cylinder 2 to restrain the dial-plate against rotation relative to the needle-cylinder. A brush 23 may be adjustably secured to one of the posts 11 in position to engage the horizontal-needles to open their latches as they are projected outward previous to the transfer of the loops therefrom.

Figure 2:
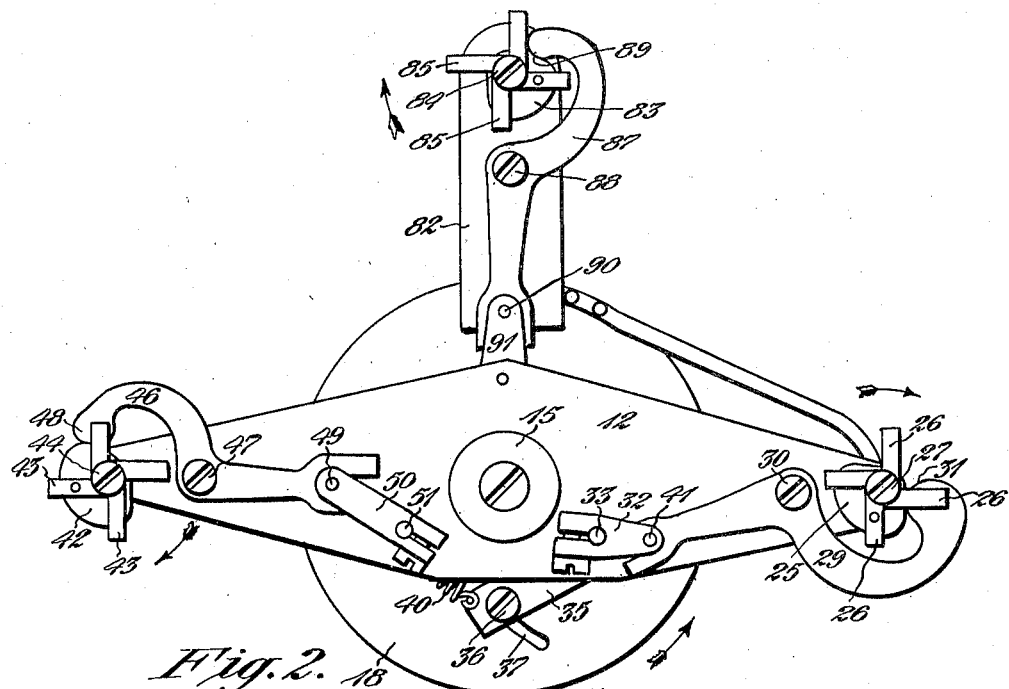
Fig. 2 is a top plan view of the cam-control mechanism.

Three mechanisms for actuating the control-devices of the needle-cam 18 are supported by the frame 12 and its associated parts, the impulse-receiving portions of two of said mechanisms being carried on the frame 12, and the third being supported from the upper cam-plate 18 itself as illustrated in the present embodiment of the invention, see Fig. 2. The impulse-receiving portion of these several mechanisms, which comprise rotatably mounted cams having radial contact arms, are spaced from each other vertically for a purpose which will be hereinafter explained.

One of these cams 25, which is provided with radial arms 26 in the manner of a star-wheel, is rotatably mounted upon a stud 27 screwed into the frame 12 and is frictionally held against accidental rotation on the stud by a compression spring 28 shown in Fig. 9. An elbow-shaped lever 29 is pivoted to the frame 12 as at 30 and provided at one end with a contact-toe 31 adapted to ride upon the periphery of the cam 25. The opposite end of the lever 29 is forked to adapt it to engage a pin 41, see Fig. 2. The pin 41 is carried by an arm 32 adjustably secured to a shaft 33 which is rotatably mounted in a boss 34 on the frame 12, see Fig. 1. An arm 35 shown in Figs. 2 and 9 is adjustably secured to the shaft 33 overlying the upper face of the cam-plate 18 and is provided with a pin or stud 36 projecting through an arcuate slot 37 in the cam-plate for engagement with the needle-control device or switch 38 which is pivoted at 39 to the under face of the cam-plate to move in a plane parallel to a plane defined by the movements of the dial needles. A coiled spring 40, shown in Figs. 1 and 9, connects the arm 35 with a portion of the frame 12 to normally retain it in the position shown in Fig. 2 of the drawings, and to operate the arm to return the cam 38 to first position.

A cam 42 for actuating a second needle-control device, shown in detail in Fig. 11, is provided with radial arms 43 and rotatably mounted upon a stud 44, being frictionally held against accidental rotation by a compression spring 45. An elbow-shaped lever 46, pivoted to the frame 12 as at 47, has one end 48 adapted to contact with the cam 42. The opposite end of the lever 46 is forked to engage a pin 49 carried by an arm 50 which, in turn, is adjustably secured to a vertical shaft 51. The shaft 51 is rotatably mounted in a bearing 52 on the frame 12, see Fig. 1, and has secured to its lower end an arm 53 which is located adjacent the upper face of the cam-plate 18. A stud or pin 54 carried by the arm 53 extends through an arcuate slot (not shown) in the cam-plate 18 to adapt it to swing the needle-control device or switch 55 about its pivot 56, and in a plane parallel to a plane defined by the movements of the dial needles, when the lever 46 is actuated by the cam 42. A tension spring 57 connecting the arm 53 to a convenient part of the frame provides for returning the arm and switch 55 to their initial positions after actuation by the cam 42.

The above described mechanism for moving the needle-control device or switch 55 is operatively connected with the actuating means for the control-device or switch which operate the transfer-members or picks, it being noted that these control-devices are operated in unison for transferring loops from the dial-needles to the vertical needles. The means for operatively connecting the mechanism for moving the switch 55 with the transfer-member control-device comprises an arm 59 adjustably secured to the shaft 51 and pivotally connected as at 60 to a link 61 which is in turn pivoted to an arm 62 at a point 63 intermediate its ends. The arm 62 is pivotally supported at one end from the frame 12 by means of a stud 64, see Fig. 1, and is provided at the opposite end with a swivel 65 slidably connected to a rod or arm 66. The arm 66 has one end fixedly attached to the vertical shaft 67, which shaft is mounted to oscillate about its axis within the axial sleeve 14 supported at the center of the frame 12.

A collar 68 is secured to the sleeve 14 below the hub of the lower cam-plate 16 by means of a set-screw 69 and an arm 70 is adjustably fastened to the lower end of the shaft 67 for movement upon rotation of the shaft 67, see Fig. 1. A post 71 carried by the arm 70, see Fig. 20, is pivotally connected to one end of a link 72 as at 73, and the link 72 is pivotally connected as at 74 with one end of an arm 75, the opposite end of said arm being pivoted at 76 to the lower face of the cam-plate 16 by suitable means not herein shown. The arm 75 is provided intermediate its ends with a pin 77 projecting upwardly through an arcuate slot (not shown) in the cam-plate 16 and engaging a hole 79 in the end of the switch or control-device 78. The pin 77 constitutes the means for moving the switch 78 about its pivot 80, and in a plane parallel to a plane defined by the movements of the transfer members, see Figs. 18 and 19, to control the action of the transfer-devices or picks during the rotation of the cam-plate 16.

From the foregoing description it will be understood that upon rotation of the cam 42, shown in Figs. 2 and 11, the lever 46 will be actuated to oscillate the shaft 51 to turn the switch 55 about its pivot 56, and at the same time motion will be transmitted to the shaft 67 through the medium of the arm 59 and its associated elements to effect a corresponding movement of the switch 78 about its pivot 80, see Figs. 16, 17, 18 and 19. In this way the movement of the switches 55 and 78 are synchronized to control the radial movements respectively of the dial-needles and transfer-members in union for effecting the transfer of loops from the dial needles to certain of the vertical needles of the machine.

Figure 3:
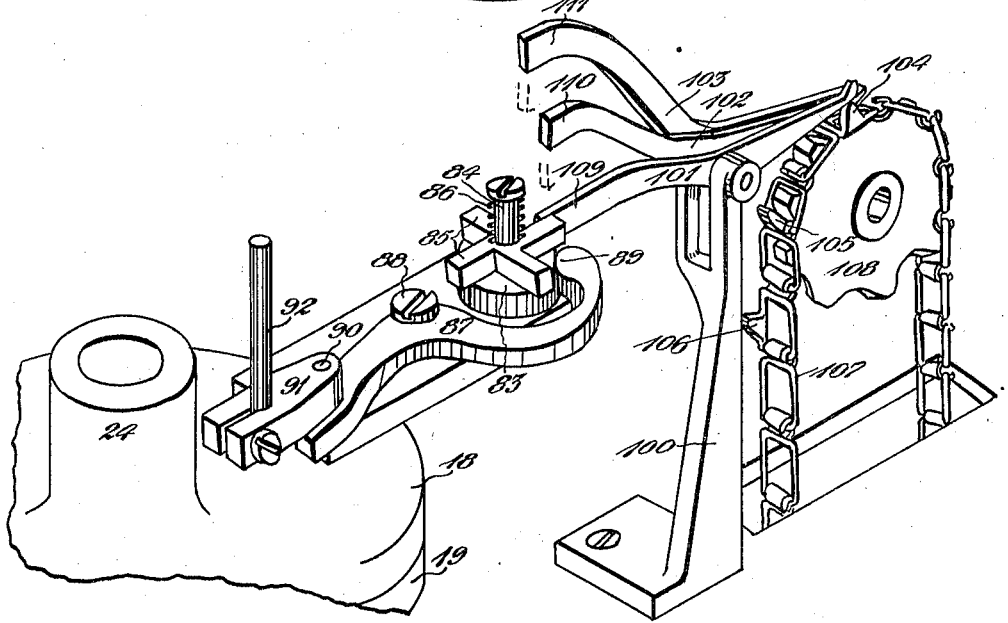
Fig. 3 is a perspective view of one part of the cam-control mechanism illustrating it in cooperative relation with respect to its actuating means.

Referring to Figs. 2 and 3, an arm or member 82 is secured to the top of the upper cam-plate 18 for supporting certain of the elements which actuate the third cam-control mechanism. A cam 83 positioned above the frame-member 82 is rotatably supported on a vertical stud 84 and provided with radial arms 85, a compression spring 86 serving to prevent unwarranted rotation of the cam on the stud. An elbow-shaped lever 87 pivotally secured to the frame-member 82 as at 88 is provided at one end with a contact-toe 89 for engagement with the periphery of the cam 83, the opposite end of said lever being forked or slotted to receive a pin 90 carried by an arm 91. The arm 91 is secured to a vertical shaft 92, see Fig. 3, which is rotatably mounted in a suitable part of the frame 12 and in the upper cam-plate 18. Referring to Fig. 13, the shaft 92 has an arm 93 adjustably secured thereto and located adjacent the upper surface of the cam-plate 18, which arm is in turn provided with a downwardly projecting stud 94 extending through an arcuate slot (not shown) in the cam-plate 18. The stud 94 engages in a hole 97 in the switch 95 and thus serves to swing the switch about its pivot 96, and in a plane parallel to a plane defined by the movements of the dial needles when the shaft 92 is rocked as the lever 87 is oscillated from the cam 83. A tension spring 98 connects the arm 93 with a convenient portion of the frame or cam-plate 18 to return the parts, including the switch 95, to their initial position when the lever 87 is released by the cam 83. It is to be observed that rotation of the cam 83 in a clockwise direction about the stud 84 causes movement of the lever arm 87 and consequent turning of the shaft 92 in a counter-clockwise direction to move the switch 95 about its pivot 96.

Any suitable means may be employed for actuating the cams 25, 42 and 83 for moving the various control-devices or switch members. As illustrated in Fig. 3 of the drawings, a standard 100 carried by a suitable fixed portion of the machine, such as the bed-plate 1, provides a mounting for three pivoted rocker-arms 101, 102 and 103. The rearwardly extending end portions of the rocker-arms 101, 102 and 103 are adapted to be engaged by lugs 104, 105 and 106, respectively, carried by a sprocket-chain 107 leading over a sprocket-wheel 108. The forwardly-extending end portions 109, 110 and 111 of the rocker-arms 101, 102 and 103 are arranged in vertically offset position or staggered relative to each other for a purpose as next explained. The forward end portions of the arms 101, 102 and 103 are adapted to be depressed with respect to their normal positions to bring these portions 109, 110 and 111 into the path of the vertically stepped cam-arms 85, 26 or 43, respectively, as the frame 12 and upper cam-plate 18 rotate with respect to the standard 100. The rocker-arms 102 and 103 are illustrated with their forward ends in raised position in Fig. 3, their depressed relation being indicated by dotted lines, while the arm 101 is represented only in its lower operative position.

In this way the cams 83, 25 and 42 are selectively rotated in a clockwise direction as viewed in Fig. 2, and with a step-by-step movement to cause them to actuate the levers 87, 29 and 46 to shift the switches 95, 38, 55 and 78 from one to another of two operative positions; this action being timed to hold the switches in the positions into which they are moved for an interval and to return them to their initial positions as regulated by the arrangement of the lugs 104, 105 and 106 on the chain 107. Each switch will be held in the position to which it is moved by its actuating cam so long as the contact-toe of its respective actuating lever is riding on the eccentric portion of the cam-face; the switch being returned to its initial position when the cam has been rotated a sufficient extent to release the elbow lever from the eccentric face of the cam.

The dial-plate 19, shown in detail in Fig. 5, is provided with a plurality of radial slots 114 for the reception of the horizontal dial needles 115, the latter being provided with latches 116 and butts 117. The radial movement of the needles in their slots 114 is effected by the travel of their butts 117 in certain grooves formed on the lower face of the upper cam-plate 18. A transfer-member or pick 118 is mounted for radial movement in each slot 114, being positioned beneath the corresponding associated dial needle 115 as shown in Fig. 4. Each transfer-member or pick 118 is provided with a butt 119 which projects downwardly through a slot 120 formed in the bottom of the dial-plate 19, and radial movement of the transfer-members is effected by guiding grooves 121 and 122 formed in the upper face of the lower cam-plate 16 and regulated by the control-device or switch 78, see Figs. 18 and 19. Each of the transfer-members 118 is provided with a pair of forwardly extending resilient arms 124 converging toward each other and forming a sort of fork having a restricted opening 125 at its end. Each of said arms 124 is formed with a laterally projecting spur 126 located adjacent the forward end thereof.

Figure 16:
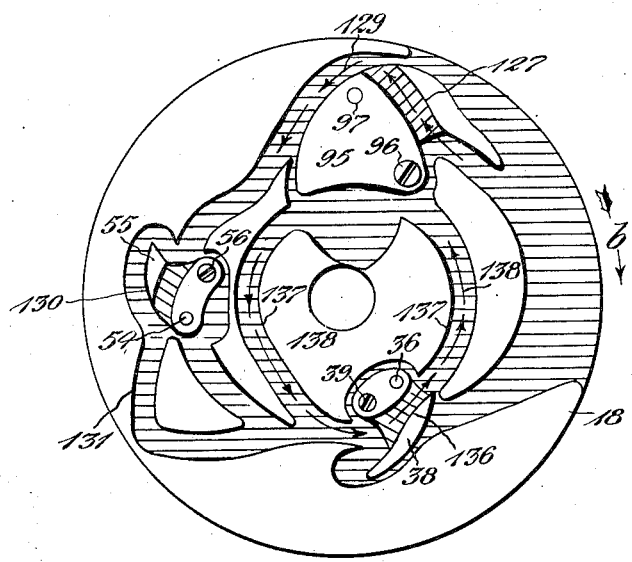
Fig. 16 is a bottom plan view of the same cam for controlling the operation of the dial-needles, the parts being shown in the position which they assume after completing the ribbed portion of the fabric to start to transfer the loops to the vertical needles.
Figure 17:
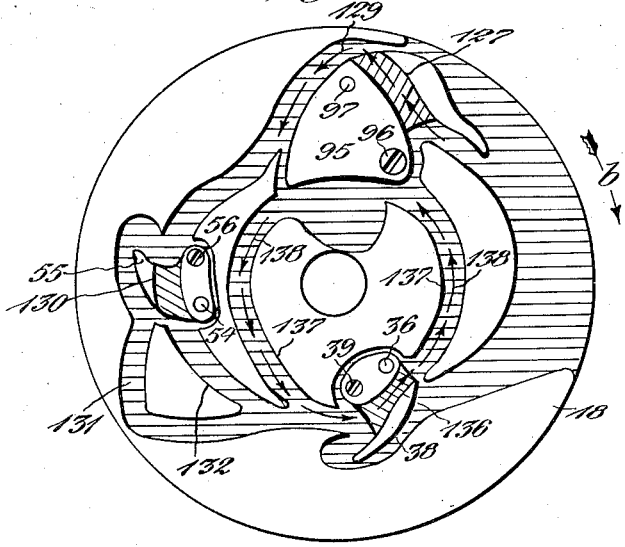
Fig. 17 is a bottom plan view of the same cam for controlling the operation of the dial-needles with the parts shown in the position they assume after completing the transfer of the loops from the dial-needles to the vertical needles.

The upper cam-plate 18 which effects the radial movement of the dial-needles 115 turns in the direction indicated by the arrows b in Figs. 15, 16 and 17, and is provided with a plurality of guiding grooves adapted to be interchangeably engaged with the butts 117 of the needles. The butts of the needles are directed from one groove to another by the control-devices or switches 38, 55 and 95 to control the radial movement of the dial needles and insure their proper action to bring them into cooperative relationship with the vertical cylinder needles 4 in forming the welt, ribbed and plain stitches in the knitting of a stocking. The form and arrangement of the grooves in the upper cam-plate 18 and their method of operation on the dial needles will be more fully set forth in the explanation of the operation of the complete machine.

As before stated, in the knitting of certain types of stockings it is customary and desirable to form different portions thereof by means of different types of stitches requiring different cooperative relationship between the vertical needles and the horizontal dial needles, and a particular object of the present invention is to provide means for controlling the dial needles to bring them into position for cooperation with the vertical needles for knitting certain portions of the stocking, as well as to change from one type of stitches to another.

The number of vertical cylinder needles 4 employed is greater than the number of horizontal needles 115, and for the purpose of illustration it may be assumed that in the present embodiment of the invention there are twice as many vertical needles as there are dial needles, although there may be three or four times as many cylinder needles as dial needles if desired. When, as in the present example, there are twice as many cylinder needles as dial needles, every alternate cylinder needle will be held out of operation during the formation of the welt and ribbed portions of the stocking. For this purpose every alternate vertical needle will be controlled by suitable mechanism connected with the cam-ring 7 or otherwise to prevent them from being raised into stitch-forming position during the knitting of the welt and ribbed portions of the stocking. Alternate or other desired selection of cylinder needles is frequently brought about by means of jacks located in tricks or grooves that are continuations of the needle grooves. Any desired means for the selection of the alternate needles may be resorted to and be within the scope of the present invention.

The usual method of knitting stockings of the character for which the present mechanism is particularly adapted is to first form a welt portion of several courses followed by a ribbed portion of any desired length, after which the formation of the stocking is continued by means of plain stitches. It is noted here, however, that the present machine is adapted to form welt and ribbed stitches alternately and to any desired extent, and to transfer automatically from either to plain stitches at any desired point in the formation of the stocking. In the operation of the machine to form the welt portion and ribbed portion, the knitting machine functions with every alternate vertical needle out of operation and their loops carried by the dial needles. During the knitting of the welt the dial needles are held in semi-retracted position by their butts following the path on the cam-plate 18 indicated by the arrows 128 in Fig. 15 of the drawings; the switches 38, 55 and 95 initially occupying the position shown in this figure to guide the needles in the path indicated. Every alternate vertical needle will be in operation to knit the welt stitches and as the machine continues to operate the desired numbers of courses of welt stitches will be formed on the vertical needles.

When a point is reached where the mechanism is to transfer from welt stitches to ribbed stitches, as selectively determined by the arrangement of the pattern chain 107, see Fig. 3, the lug 104 on the chain engages the outer end of the rocker-arm 101 and depresses the forward end 109 of said arm to cause it to engage one of the arms 85 of the star-wheel to rotate the cam 83. The cam 83 will thus be rotated a sufficient distance to cause the contact-toe 89 of the arm 87 to be forced outwardly by the eccentric face of the cam. This action results in moving the control-device or switch 95 from the position shown in Fig. 15 to the position illustrated in Fig. 16 of the drawings, while the switches 38 and 55 continue to occupy their initial positions as shown in Fig. 15. With the parts in this relation continued operation of the machine causes the dial needles 115 to deviate from the path indicated by the arrows 128 in Fig. 15 to the extent that the butts of the needles 117 pass through the groove 127 in the switch 95 and follow the path indicated by the arrows 129 in Fig. 16. While following this path the dial needles are moved radially outward and into cooperative relation with those cylinder needles which are in operation to form therewith the rib stitches in the usual manner as will be understood by those skilled in the art. If it is desired to change the mechanism for the formation of further courses of welt stitches after an interval of ribbed knitting it is necessary only to bring a second lug 104 into contact with the rocker-arm 101 and thus give a quarter turn to the cam 83 to cause the switch 95 to be returned to the initial position shown in Fig. 15 whereby to hold the dial needles in semi-retracted position while more welt stitches are being formed on the vertical needles which are in operation. The operation of changing from welt to ribbed stitches again may then be effected in the manner as previously explained.

After knitting the desired length of ribbed portion for the stocking with the switches 38 and 55 in the position shown in Fig. 15, to change to plain knitting a lug 106 on the chain 107 is brought into contact with the outer end of the rocker-arm 103 whereby the forward end portion 111 of the rocker-arm 103 is depressed into the position shown by dotted lines in Fig. 3. In this latter position the end portion 111 of the arm 103 will engage one of the arms 43 of the star-wheel to rotate the cam 42 and to cause it to swing the lever 46 and rotate the shaft 51, whereby the switch 55 is moved outwardly from the position shown in Fig. 15 to the position shown in Fig. 16. With the switch 55 shifted into this position the butts of the dial needles 115 will pass through the groove 130 therein and into the groove 131 in the face of the cam-plate 18. Rotation of the shaft 51 results in simultaneous rotation of the shaft 67 through the intermediacy of the link-motion comprising the elements 59, 61, 62 and 66, shown in Fig. 11, whereby the control-device or switch 78 on the lower cam-plate 16 is moved from the position shown in Fig. 18 to the position shown in Fig. 19. As before stated, the cam-plate 16 controls the operation of the transfer-members or picks 118 and the butts 119 of said members 118 will pass through the groove 133 in the switch 78 and be directed away from the groove 121 into the groove 122. It is noted here that the showing of the lugs 104, 105 and 106 on the pattern chain 107, see Fig. 3, is not intended to indicate their exact relationship for timing the action of the rocker-arms 101, 102 and 103, the lugs being merely shown in this relation for convenience of illustration.

Figure 18:
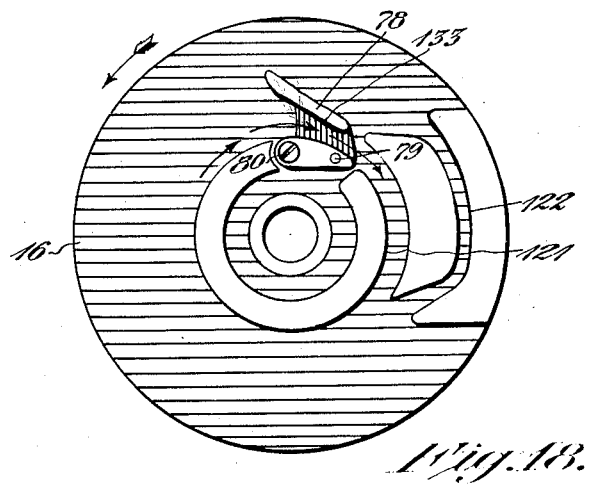
Fig. 18 is a top plan view of a second cam for controlling the operation of the transfer-members or picks, with the parts shown in the position which they occupy during the knitting of the welt and ribbed portions of the fabric.

The movement of the switch 55 on the cam-plate 18 from the position shown in Fig. 15 to that illustrated in Fig. 16 is substantially simultaneous with the movement of the switch 78 from the position shown in Fig. 18 to that illustrated in Fig. 19. The movement of the switch 55 results in directing the butts 117 of the dial needles 115 from the groove section 132 into the groove section 131, thus forcing the dial needles outwardly into their extreme position to permit the transfer of the yarn loops therefrom. The movement of the switch or control-member 78 from the position shown in Fig. 18 to that shown in Fig. 19 causes the butts 119 of the transfer-members 118 to move outwardly and follow the groove 122 instead of the groove 121 in which they have been previously traveling. This outward movement of each dial needle and its associated transfer-member takes place just previous to the upward movement of the corresponding initially inactive vertical needles 4. As the transfer-member 118 continues its outward movement beyond the dial needle 115 its prongs or spurs 126 engage the loop 134 carried by the dial needle, see Fig. 6, and forces this loop outwardly over the latch of the needle which has been brought into closed relation by the loop as shown in Fig. 7. It should be explained that this previously inactive vertical needle 4 in moving upwardly enters the opening 125 in the transfer-member 118 to receive the loop 134, see Fig. 4, and as the transfer-member is then moved rearwardly its flexible arms 124 spring open slightly and slide back over the vertical needle as shown in Fig. 4. In this manner the loops carried by the dial needles are transferred to the appropriate previously inactive vertical needles which are moved upwardly successively around the circumference of the needle cylinder 2. It should be further explained that the outward movement of the dial needle 115 causes the loop 134 to slide back thereon to open its latch 116 and clear the same as shown in Fig. 6, and as the loop is slid off from the dial-needle as illustrated in Fig. 7 it closes the latch again. This operation continues during one complete revolution of the cylinder to transfer all the loops carried by the dial needles to the previously inactive alternate vertical needles. As will be noted the dial needles as well as the transfer members 118 are, normally or when in knitting relation, positioned directly opposite their companion cylinder needles to which the stitches are transferred. Such a positioning of the dial, transfer members and cylinder needles permits a straight transfer from dial to cylinder needles or vice versa as the case may be; the straight transfer resulting in a perfect joining of the rib and plain fabric sections without a distortion or racking sidewise of the transferred wales. In other words, the straight transfer maintains the rib wale knit on a dial needle before transfer, in alignment with the same wale knit on the companion cylinder needle after transfer of the stitch thereto.

Immediately after the outward movement of the control-members or switches 55 and 78 as above explained, the lug 105 carried by the chain 107 engages the outwardly extending end of the rocker-arm 102 thus causing the inner end 110 thereof to be depressed into the position shown by dotted lines in Fig. 3 to engage one of the star-wheel arms 26 on the cam 25 to rotate the latter. The cam 25 is thus caused to swing the lever 29 to move the control-member or switch 38 from the position shown in Fig. 15 into the position illustrated in Fig. 16 to thereby direct the butts of those dial needles from which the loops have been transferred as above explained through the groove 136 in the switch and into the groove 137 in the cam-plate 18 where the butts of the dial needles continue their travel in the path indicated by the arrows 138 during the knitting of the plain portion of the stocking. In other words, the dial-needles while following the path indicated by the arrows 138 are entirely retracted and the knitting of the plain portion of the stockings proceeds with all of the vertical cylinder-needles in operation and all of the horizontal needles idle as is required for plain knitting. It will be understood that the leg portion of the stocking below the ribbed top and the foot are produced by plain knitting and the heel and toe portions may be formed in the usual manner as well known to those versed in the art. Upon the completion of the stocking the control-mechanism of the machine may be reset, either automatically or manually, to commence the knitting of another stocking by moving the switches 38, 55 and 95 from the position shown in Fig. 17 into the position shown in Fig. 15.

While the present embodiment of the invention has been shown and described more particularly with reference to the knitting of stockings, it is to be understood that the novel combination and arrangement of elements herein disclosed, or selected parts thereof, are capable of more general application in the knitting and kindred arts.

It is to be further noted that the present invention may be embodied in a mechanism such as herein illustrated for use as an attachment on circular knitting machines either of the rotary cylinder or rotary cam type, or it may be constructed as an inbuilt part of the knitting machine.

Moreover, the form of construction of the invention as herein described and illustrated is by way of example only, and the parts and arrangement of its mechanisms may be modified without departing from the spirit and scope of the appended claims.

We claim:

1. In a knitting machine having a series of vertical needles and a series of radially movable horizontal needles adapted to cooperate to knit rib fabric, the horizontal needles being directly opposite some of the vertical needles, the combination of automatically operated means separate from the needles for transferring loops carried by the horizontal needles to certain of the vertical needles, the movements of the two series of needles each being so controlled as not to interfere with the movements of the other series of needles.

2. In a knitting machine having a series of vertical needles and a series of horizontal needles adapted to cooperate to knit rib fabric, the horizontal needles being directly opposite some of the vertical needles, the combination of automatic means separate from the needles for transferring loops carried by said horizontal needles to certain of the vertical needles, and means for retaining the horizontal needles in retracted position with respect to the vertical needles after the transfer of the loops therefrom, the movements of the two series of needles each being so controlled as not to interfere with the movements of the other series of needles.

3. In a knitting machine, a plurality of vertical needles, a plurality of horizontal needles, and a plurality of transfer-members arranged in co-operative relation with said horizontal needles and each provided with a pair of flexible converging arms having outwardly extending prongs and lateral loop engaging projections, said arms being shaped to provide a space therebetween for the reception of a vertical needle.

4. In a knitting machine, a series of vertical needles, a series of horizontal dial needles positioned directly opposite thereto and adapted to cooperate with said vertical needles, and a series of horizontal transfer-members adapted to remove loops from dial needles and to position the said loops for transfer to certain of the vertical needles each of the transfer members being located beneath a corresponding dial needle and provided with flexible arms at least one of which is flexible said arms being shaped to form a space for the reception of a vertical needle, the vertical and horizontal series of needles each being so controlled as not to interfere with the operation of the other series.

5. In combination, a dial and cylinder, needles therein, and transfer members independent of the needles, certain of the cylinder needles being normally disposed directly opposite certain of the dial needles which dial needles are adapted to transfer their stitches to said certain of the cylinder needles by co-operative movements of the dial and cylinder needles and transfer members, all of the needles being so controlled in their movements as not to interfere with others of the needles.

6. In combination, a dial and cylinder, needles therein, certain of the cylinder needles being normally disposed directly opposite certain of the dial needles which dial needles are adapted to transfer their stitches to said certain of the cylinder needles by co-operative needle movements of the dial and cylinder needles, transfer members associated with the dial and cylinder needles and being adapted to remove the stitches from the dial needles and position the same for transfer to the companion cylinder needles, all of the needles being so controlled in their movements as not to interfere with others of the needles.

7. In combination, a dial and a cylinder each having a set of needles therein, certain of the cylinder needles being normally disposed directly opposite certain of the dial needles, means for operating the dial and cylinder needles to transfer stitches from one set of needles to the other, and means consisting of transfer members independent of the needles adapted to assist in the said stitch transfer, all of the needles being so controlled in their movements as not to interfere with others of the needles.

8. In combination, a dial and a cylinder each having a set of needles therein, certain of the cylinder needles being normally disposed directly opposite certain of the dial needles, means for operating the dial and cylinder needles to transfer stitches from one set of needles to the other and means consisting of transfer members adapted to assist in the said stitch transfer, said transfer members being in alignment with the dial and cylinder needles, all of the needles being so controlled in their movements as not to interfere with others of the needles.

9. In combination, two needle banks having needles therein, certain of the needles in one bank being normally disposed directly opposite certain of the needles in the other bank, said certain needles of the first mentioned bank adapted to transfer their stitches to the said certain needles of the other bank by cooperative movements of the said certain needles in the respective banks, means associated with the said certain needles in the respective banks adapted to assist in the stitch transfer by removing the stitches from the needles first mentioned, all of the needles being so controlled in their movements as not to interfere with others of the needles.

10. In combination, two needle banks having needles therein, certain of the needles in one bank being normally disposed directly opposite certain of the needles in the other bank, said certain needles of the first mentioned bank adapted to transfer their stitches to the said certain needles of the other bank by cooperative movements of the said certain needles in the respective banks, means associated with the said certain needles in the respective banks adapted to assist in the stitch transfer, said means consisting of members independent of the needles adapted to remove the stitches from the respective needles of one bank and position the said stitches for transfer to the companion needles of the other bank, all of the needles being so controlled in their movements as not to interfere with others of the needles.

11. In a dial and cylinder knitting machine of the independent needle type, dial and cylinder needles positioned directly opposite one another, means adapted to transfer stitches from one set of needles to the other, said means consisting of movable members adapted, by their movements, to remove stitches from one set of needles and position the said stitches for transfer to the other set of needles, means adapted to control the movements of the transfer members including an inactive cam path and an active cam path whereby the transfer members are caused to assist in the transfer of stitches, all of the needles being so controlled as not to interfere with others of the needles.

12. In a dial and cylinder knitting machine of the independent needle type, dial and cylinder needles positioned directly opposite one another, means adapted to transfer stitches from one set of needles to the other, the transfer of each stitch to each needle of the said other set of needles being effected while each corresponding needle of the first set is in retracted position, means adapted to control the movements of the transfer members including an inactive cam path and an active cam path whereby the transfer members are caused to assist in the transfer of stitches, all of the needles being so controlled as not to interfere with others of the needles.

13. In an independent needle knitting machine, two sets of needles, needles of one set being directly opposite needles of the other set, the two sets of needles being adapted by their cooperative movements to knit ribbed fabric and one of the said sets adapted to knit plain fabric, means to effect the transition from ribbed to plain fabric consisting of transfer members cooperating in timed relation with one set of needles and adapted to remove the stitches from said set of needles, whereby the said stitches may be positioned for transfer to the other set of needles, means adapted to control the movements of the transfer members including an inactive cam path and an active cam path whereby the transfer members are caused to assist in the transfer of stitches, all of the needles being so controlled in their movements as not to interfere with others of the needles.

14. A knitting machine of the independent needle type consisting of two needle beds and two sets of needles each said set being independently mounted in a said needle bed, the two needle beds being opposed and the needles therein adapted to knit ribbed fabric or plain fabric as desired, the needles all being longitudinally slidable to and from knitting position and the needles in one of the needle beds being positioned directly opposite certain of the needles in the other, transfer members associated with the needles in one of the beds and adapted to move and transfer stitches from said needles to such a position as to be engaged by needles in the other needle bed, all of the needles being so controlled in their movements as not to interfere with others of the needles.

15. A knitting machine of the independent needle type having a needle dial and a needle cylinder, two sets of needles one set being mounted for independent movements in the dial and the other set being mounted for independent movements in the cylinder and the two sets of needles adapted to draw stitches in opposite directions and thereby knit ribbed fabric, the needles all being longitudinally slidable to and from knitting position, the needles in the dial being positioned directly opposite certain of the needles in the cylinder, transfer members associated with the dial needles and adapted to move and transfer stitches from the dial needles to such a position as to be engaged by said certain of the cylinder needles, all of the needles being so controlled in their movements as not to interfere with others of the needles.

16. A knitting machine of the independent needle type having two needle beds and two sets of needles each set being independently mounted in a needle bed, the two needle beds being opposed and the needles therein adapted to knit ribbed fabric or plain fabric as desired, the needles all being longitudinally slidable to and from knitting position and the needles in one of the needle beds being positioned directly opposite certain of the needles in the other, transfer members directly beneath the needles of one of the needle beds and adapted to move and transfer stitches from the needles in one of the needle beds to such a position as to be engaged by needles in the other needle bed, all of the needles being so controlled in their movements as not to interfere with others of the needles.

17. A knitting machine of the independent needle type having a dial and a cylinder with needles independently mounted therein, needles in the dial adapted to knit rib wales while the needles in the cylinder knit plain wales, the needles all being longitudinally slidable to and from knitting position, the needles in the dial being directly opposite certain of the needles in the cylinder, transfer members positioned directly beneath the dial needles and adapted to move and transfer stitches from the dial needles to such a position as to be engaged by said certain needles, all of the needles being so controlled in their movements as not to interfere with others of the needles.

18. A knitting machine of the independent needle type having a dial and a cylinder, needles independently mounted in the said dial and cylinder, and adapted to knit ribbed fabric or plain fabric as desired, the needles all being longitudinally slidable to and from knitting positions, the needles in the dial having latches and being directly opposite certain of the needles in the cylinder, transfer members associated with the dial needles and adapted to move to transfer stitches from the dial needles to such a position as to be engaged by said certain of the cylinder needles, means adapted to clear the dial needle latches of their loops or stitches preparatory to transfer of the said loops or stitches, means thereafter adapted to relatively move the dial needles and transfer members so that the latter will remove the loops or stitches from the dial needles, means thereafter adapted to move said certain of the cylinder needles through the loops or stitches carried by the transfer members, all of the needles being so controlled in their movements as not to interfere with others of the needles.

GEORGE J. H. JACQUES.
AIME H. JACQUES.